Feb. 18, 1964 R. GREINER 3,121,307
BALANCE SPRING COLLET FOR FASTENING THE INNER END
OF A BALANCE SPRING FOR A TIMEPIECE
Filed Sept. 17, 1962
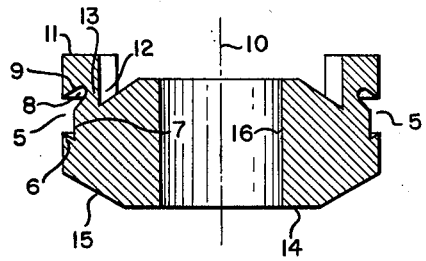
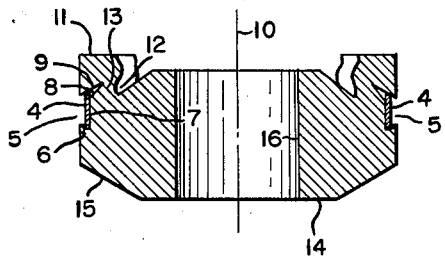
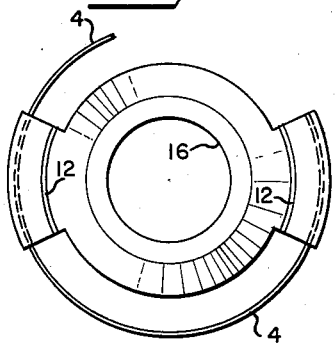
INVENTOR
RUDOLF GREINER
BY *Lawrence E. Laubscher*
ATTORNEY

United States Patent Office 3,121,307
Patented Feb. 18, 1964

3,121,307
BALANCE SPRING COLLET FOR FASTENING THE INNER END OF A BALANCE SPRING FOR A TIMEPIECE
Rudolf Greiner, Langenthal, Bern, Switzerland, assignor to Greiner Electronic A.G., Langenthal, Switzerland, a corporation of Switzerland
Filed Sept. 17, 1962, Ser. No. 223,991
Claims priority, application Switzerland Dec. 19, 1961
3 Claims. (Cl. 58—115)

This invention relates to a balance spring collet for fastening the inner end of a balance spring for a timepiece. An object of the invention is a balance spring collet of the kind outlined having a groove dimensioned to accommodate the inner end of said balance spring and being designed so that said inner end of the balance spring bearing on the base of said groove is fastened to said collet through deformation of said collet, said collet having in its undeformed condition a groove of substantially dovetailed cross-section and the base of said groove having an additional notch extending inwardly of said collet. Another object of the invention is a balance spring collet having a groove dimensioned to accommodate said inner end of the balance spring and being designed so that the inner end of said balance spring bearing on the base of said groove is fastened to said collet through deformation of the collet, said collet having in its undeformed condition a groove of substantially dovetailed cross-section and the base of said dovetailed groove having an additional notch extending inwardly of said collet, and said collet having a recess extending axially inwards far enough to form a deformable neck between it and said notch. In order to fasten the inner end of the balance spring to the balance spring collet, said neck is compressed in an axial direction.

These and other objects and the advantages of the invention will best be understood from the following description of a specific embodiment when read in connection with the accompanying drawing in which:

FIG. 1 is a section through the undeformed balance spring collet,

FIG. 2 is a section through the collet shown in FIG. 1, the inner end of a balance spring having been placed in the groove and the collet deformed to fasten the spring, and FIG. 3 is a plan view corresponding to FIG. 2.

As shown in the plan view in FIG. 3, the balance spring collet has a two-wing construction, the two wings being diametrically opposed and designed to hold the innermost coil of a balance spring 4. For this purpose a groove 5 of substantially dovetail cross-section is formed in the two wings, as shown in FIG. 1. This dovetail cross-section comprises one side 6, the base 7 of the groove, a notch 8 extending from the base 7 obliquely towards the axis 10, and the other side 9. The base 7 acts as a supporting surface for the balance spring 4 to be inserted. As shown in FIG. 2, the depth of the groove 5 in a radial direction, is greater than the thickness of the blade of the balance spring 4; this depth of the groove 5 is preferably chosen to be about twice the thickness of the balance spring blade. In the direction of the axis 10 of the collet, the groove 5 is of a dimension sufficiently in excess of the blade width of the spring 4, so that springs of slightly varying blade height can also be inserted in the groove 5 (FIGS. 1 and 2). On the front end 11 of the collet, adjoining the notch 8, there is formed a recess 12 which predominantly takes in the area of the two projecting wings of the collet (FIG. 3) and extends in the direction of the axis 10 far enough for a narrow neck 13 to be formed between it and the notch 8, as illustrated in FIG. 1. The end 11 is flat and extends in a plane normal to the axis 10. The other opposite end 14, adjacent the side 6 has a tapered supporting surface 15. The sides 6 and 9, the base 7 of the grove, the notch 8, the recess 12 and the tapered supporting surfaces 14, 15 are all parts of surfaces of revolution having the common axis 10 as their axis of rotation. They are therefore easy to produce on an automatic rotary machine. Finally, the collet also has a fastening hole 16 by means of which it is placed on the balance shaft of a timepiece. The hole 16 may, as illustrated, also be arranged concentrically with the axis 10 of the collet. It is also possible, however, to locate the hole 16 eccentrically to the axis 10, in order to cater for special requirements.

In order to deform the collet a press is used, the platen of which is adapted to the tapered supporting surface 15 of the collet so that the collet is centered in it and all of its tapered surface 15 is seated on it. The mobile ram of the press is dimensioned so that it can bear closely on the flat portion of the front 11 of both wings of the collet and exerts deforming forces acting in the direction of the axis 10 when it is depressed. Thus if the inner end of the balance spring 4 is inserted in the groove 5 in both wings of the collet and the press ram is operated, the neck 13 being the weakest part of the collet will be deformed approximately as in FIG. 2, the side 9 of the groove 5 being simultaneously moved towards side 6 in the direction of the axis 10 and the notch 8 being partially compressed. The thrust of the ram is controlled so that, in the deformed state of the collet shown in FIG. 2, the inserted spring 4 is easily enclosed by the sides 6 and 9 and clamped to the collet. Since the spring 4 bears on one side on the undeformed side 6, it will always be exactly in a plane normal to the axis 10. This result is also obtained if the blade width of the spring 4 is liable to fluctuate from one spring to another, as any variation of the blade width from the nominal value can be compensated for merely by suitable altering the thrust of the ram. It is therefore possible to fix balance springs of different blade width in the collet described.

The collet described is simple and inexpensive to produce, and the deformation thereof is not a delicate operation and can be reliably effected even by inexperienced labour if suitable presses are used. Series or semi-automatic operation can also be introduced for fixing the inner end of the balance spring to the collet.

The detailed design of the collet is not restricted to the example shown. The recess 12 can, for example, also be formed by a notch obliquely extending from the inside, so that a conical notch is generated and the flat front end 11 is widened towards the axis 10. It is also possible to make the two sides 6 and 9 of the groove 5 symmetrical and to sink the radial notch 8 in the centre of the base 7 of the groove. In this case the recess 12 must be made correspondingly deeper in the direction of the axis 10 for producing a deformable neck 13. Compared with these and similar variations which may occur to those familiar with the art, the collet illustrated in the drawing has been found superior, mainly for reasons of manufacturing technique.

I claim:

1. A balance spring collet for fastening the inner end of a balance spring for a timepiece, said collet having a groove dimensioned to accommodate the inner end of said balance spring and being designed so that said inner end of the balance spring bearing on the base of said groove is fastened to said collet through deformation of the collet, said collet having in its undeformed condition a groove of substantially dovetailed cross-section and the base of said groove having an additional notch extending inwardly of said collet, and said collet having a recess extending axially inwards far enough for a deformable neck to be formed between it and said notch.

2. A balance spring collet according to claim 1, in which said neck is able to be compressed in an axial direction in order to fasten the inner end of said balance spring to said collet.

3. A balance spring collet according to claim 1, in which said groove, said notch in the base of the groove, and said recess are all parts of coaxial surfaces of revolution.

References Cited in the file of this patent

UNITED STATES PATENTS 2,807,083     Zilliacus et al.  ---------- Sept. 24, 1957

FOREIGN PATENTS 257,779     Switzerland ------------ Apr. 16, 1949
311,287     Switzerland ------------ Jan. 31, 1956